US012736774B2

(12) United States Patent
Sato et al.

(10) Patent No.: US 12,736,774 B2
(45) Date of Patent: Sep. 15, 2026

(54) MIRROR UNIT

(71) Applicant: Nippon Seiki Co., Ltd., Niigata (JP)

(72) Inventors: Genichiro Sato, Niigata (JP); Masahiko Mizuochi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 253 days.

(21) Appl. No.: 18/697,176

(22) PCT Filed: Sep. 27, 2022

(86) PCT No.: PCT/JP2022/035829
§ 371 (c)(1),
(2) Date: Mar. 29, 2024

(87) PCT Pub. No.: WO2023/054306
PCT Pub. Date: Apr. 6, 2023

(65) Prior Publication Data

US 2024/0402461 A1 Dec. 5, 2024

(30) Foreign Application Priority Data

Sep. 30, 2021 (JP) ................................ 2021-160287

(51) Int. Cl.
*G02B 7/198* (2021.01)
*B60K 35/231* (2024.01)
(Continued)

(52) U.S. Cl.
CPC ............ *G02B 7/198* (2013.01); *B60K 35/231* (2024.01); *B60K 35/55* (2024.01); *B60K 35/60* (2024.01);
(Continued)

(58) Field of Classification Search
CPC ................ G02B 7/198; G02B 27/0101; G02B 7/1821; G02B 7/1827; G02B 2027/0154;
(Continued)

(56) References Cited

U.S. PATENT DOCUMENTS

2013/0155520 A1* 6/2013 Shimada ................ G02B 27/01 359/630
2017/0336632 A1* 11/2017 Ushida ..................... H04N 5/74
(Continued)

FOREIGN PATENT DOCUMENTS

JP 2009229782 A 10/2009
JP 2016218163 A 12/2016
(Continued)

OTHER PUBLICATIONS

International Search Report dated Nov. 22, 2022 issued in International Patent Application No. PCT/JP2022/035829, with English translation.
Office Action dated Dec. 17, 2025, issued in corresponding Japanese Patent Application No. JP2023-551499.

*Primary Examiner* — Pinping Sun
*Assistant Examiner* — Ruby L Kauffman
(74) *Attorney, Agent, or Firm* — Rimon P.C.

(57) ABSTRACT

Provided is a mirror unit capable of maintaining good vibration proof. A mirror unit comprises a reflecting mirror, and a holder that holds the reflecting mirror from a back surface thereof. The mirror unit rotates about an axis by the holder being pressed by a linearly moving slider, and is provided in a head-up display device. The holder comprises a part to be pressed, a first support part, and a second support part. The part to be pressed is located at a position that deviates from a center of the reflecting mirror toward a first end of the reflecting mirror, and is pressed by the slider. The first support part is located at a position corresponding to the part to be pressed, and is affixed to the back surface. The second support part is located closer to a second end of the reflecting mirror than the first support part, has a larger outer shape than the first support part, and is affixed to the back surface.

5 Claims, 3 Drawing Sheets

(51) Int. Cl.
*B60K 35/55* (2024.01)
*B60K 35/60* (2024.01)
*B60K 35/81* (2024.01)
*G02B 27/01* (2006.01)

(52) U.S. Cl.
CPC .......... *B60K 35/81* (2024.01); *G02B 27/0101* (2013.01); *G02B 2207/101* (2013.01)

(58) Field of Classification Search
CPC ........ G02B 2027/0159; G02B 27/0149; G02B 27/01; B60K 35/231; B60K 35/55; B60K 35/60; B60K 35/81; B60K 2360/23; B60K 2360/334; B60K 35/53
See application file for complete search history.

(56) References Cited

U.S. PATENT DOCUMENTS

2018/0292650 A1* 10/2018 Sato .................. G02B 27/0101
2021/0003815 A1 1/2021 Tabata et al.

FOREIGN PATENT DOCUMENTS

| | | | |
|---|---|---|---|
| JP | 2019109304 | A | 7/2019 |
| JP | 2019174674 | A | 10/2019 |
| JP | 2019215548 | A | 12/2019 |
| JP | 6733470 | B2 | 7/2020 |
| JP | 2021102412 | A | 7/2021 |
| WO | 2019082954 | A1 | 5/2019 |

* cited by examiner 10
15
15a
15b
20
13a
13b
L
12
30
13
AX
36a
34
11
14
X

FIG. 3

MIRROR UNIT

CROSS-REFERENCE TO RELATED APPLICATIONS

This application is the U.S. National Phase under 35 U.S.C. § 371 of International Application No. PCT/JP2022/035829, filed on Sep. 27, 2022, which claims the benefit of foreign priority to Japanese Patent Application No. 2021-160287 filed on Sep. 30, 2021, the entire contents of each of which are hereby incorporated by reference.

TECHNICAL FIELD

The present disclosure relates to a mirror unit, and more particularly, to a mirror unit provided in a head-up display device.

BACKGROUND ART

For example, Patent Document 1 describes a mirror unit provided with a holder which holds a reflecting mirror from a back surface. The mirror unit is rotatable about an axis by having a part to be pressed (i.e., an arm portion 31*d* of Patent Document 1) provided on the holder pressed. The holder has a bilaterally symmetrical shape.

PRIOR ART DOCUMENT

Patent Document

Patent Document 1: Japanese Patent No. 6733470

SUMMARY OF THE INVENTION

Problems to be Solved by the Invention

Due to constraints of the layout, there may be a case where a part to be pressed must be arranged at a position deviated from the center of a reflecting mirror. In this case, if a holder has a bilaterally symmetrical shape, the natural frequency is decreased at an end of the reflecting mirror which is located far from the part to be pressed, and it is feared that vibration resistance may not be maintained.

An object of the present disclosure is to provide a mirror unit capable of maintaining vibration resistance favorably.

Solution to Problem

In order to achieve the above object, a mirror unit according to the present disclosure as a first configuration is provided with: a reflecting mirror; and a holder which holds the reflecting mirror from a back surface thereof, and the mirror unit rotates about an axis as the holder is pressed by a slider which moves linearly, and is provided in a head-up display device, in which the holder includes: a part to be pressed, which is at a position deviated from the center of the reflecting mirror toward a first end of the reflecting mirror in a direction in which the axis extends, and is pressed by the slider; a first support part, which is at a position corresponding to the part to be pressed, and is fixed to the back surface; and a second support part, which is located closer to a second end opposite to the first end of the reflecting mirror than the first support part, is larger than the first support part in outer shape, and is fixed to the back surface.

In the first configuration, the mirror unit according to the present disclosure as a second configuration is configured such that: the first support part is fixed to the back surface by a first double-sided tape; the second support part is fixed to the back surface by a second double-sided tape; the second double-sided tape is formed in a shape of a frame having an opening; and the area of the first double-sided tape is less than or equal to the area of the opening.

In the first or second configuration, the mirror unit according to the present disclosure as a third configuration is configured such that an outer shape of each of the first support part and the second support part is rectangular.

In the configuration of any one of the first to third configurations, the mirror unit according to the present disclosure as a fourth configuration is configured such that an upper end of the second support part is closer to an upper end of the reflecting mirror than an upper end of the first support part.

In the configuration of any one of the first to fourth configurations, the mirror unit according to the present disclosure as a fifth configuration is configured such that, of two regions obtained by dividing an outer shape of the second support part along the axis, when one region close to an upper end of the reflecting mirror is assumed as a first region, and the other region is assumed as a second region, the area of the first region is greater than the area of the second region.

In the configuration of any one of the first to fifth configurations, the mirror unit according to the present disclosure as a sixth configuration is configured such that: the center of gravity of an outer shape of the first support part is at a position which is deviated from the center of the reflecting mirror toward the first end in the direction in which the axis extends; and the center of gravity of an outer shape of the second support part is at a position which is deviated from the center of the reflecting mirror toward the second end in the direction in which the axis extends.

Effect of the Invention

According to the present disclosure, it is possible to maintain the vibration resistance favorably.

BRIEF DESCRIPTION OF THE DRAWINGS

FIG. 3 is a diagram illustrating arrangement of a first double-sided tape and a second double-sided tape according to the above-mentioned embodiment.

MODE FOR CARRYING OUT THE INVENTION

An embodiment of the present disclosure will be described with reference to the drawings.

Figure 1:
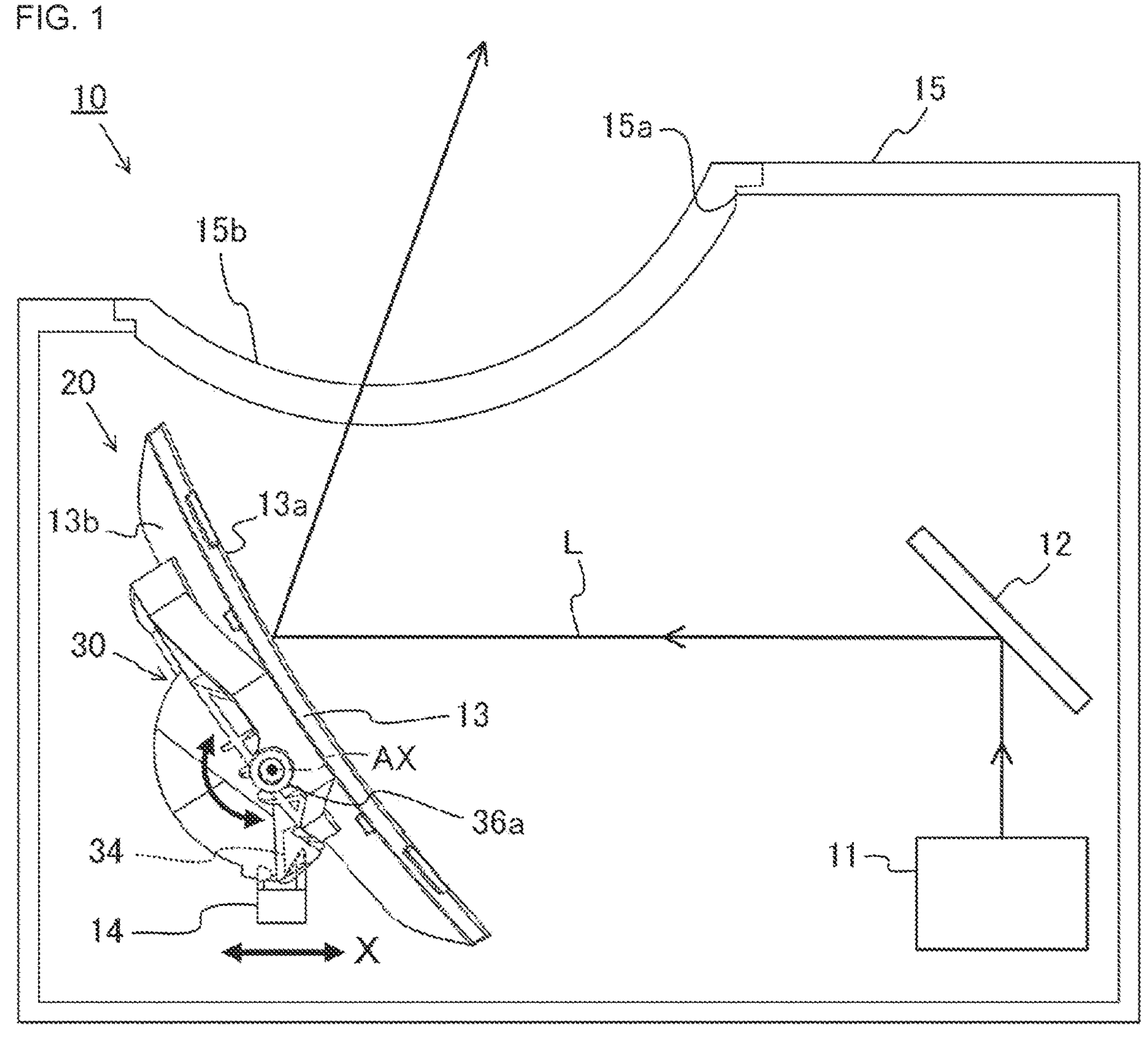
FIG. 1 is a schematic configuration diagram of a head-up display (HUD) device according to an embodiment of the present disclosure.

A head-up display (HUD) device 10 illustrated in FIG. 1 is provided in, for example, a dashboard of a vehicle. The HUD device 10 radiates display light L toward a windshield of the vehicle. The display light L reflected by the windshield causes a user to visually recognize a virtual image of an image represented by the display light. The virtual image is displayed toward the front of the vehicle via the windshield, and is capable of presenting various kinds of information regarding the vehicle.

The HUD device 10 is provided with a display portion 11, an optical path changing mirror 12, a mirror unit 20 including a reflecting mirror 13, a slider 14, and a housing 15.

The display portion 11 displays an image, thereby radiating the display light L representing the image. The display portion 11 is configured by including, for example, a liquid crystal display (LCD) and a backlight which illuminates the LCD from the back. The LCD is of a thin-film transistor (TFT) type, for example. The backlight is configured from, for example, a light-emitting diode (LED), a light guide member, and the like.

The optical path changing mirror 12 changes the optical path of the display light L radiated from the display portion 11. Specifically, the display light L reflected by the optical path changing mirror 12 is directed toward the reflecting mirror 13. The optical path changing mirror 12 is formed of a plane mirror or a curved mirror, and is fixed to the housing 15 via a member which is not illustrated.

The reflecting mirror 13 reflects the display light L from the optical path changing mirror 12 toward the windshield of the vehicle. The reflecting mirror 13 is formed of, for example, a concave mirror, and reflects the display light L by a reflection surface 13*a* facing the optical path changing mirror 12. By the function of the concave mirror, a virtual image is visually recognized by the user in a size in which the image displayed on the display portion 11 is enlarged.

The slider 14 is configured such that the slider 14 moves linearly in an X direction indicated in FIG. 1, and presses a holder 30, which will be described later, to rotate the mirror unit 20 about an axis AX. The slider 14 can reciprocate along the X direction by a drive mechanism which is not illustrated. The drive mechanism is provided with a motor, a conversion mechanism which converts a rotational motion of the motor into a linear motion, and the like. The conversion mechanism is configured from a lead screw, a ball screw, and the like, and causes the slider 14 to reciprocate along the X direction.

Note that the HUD device 10 is provided with a control portion (not illustrated) which controls the operation of the motor of the drive mechanism, thereby controlling the reciprocating movement of the slider 14. As the control portion adjusts the rotational position of the reflecting mirror 13 which is changed in accordance with the movement of the slider 14, the display position of a virtual image in an up-down direction, as seen from the user, can be adjusted. The control portion is configured from, for example, a microcomputer, and also controls the display operation of the display portion 11.

The housing 15 accommodates the display portion 11, the optical path changing mirror 12, the slider 14, and the mirror unit 20. The housing 15 is formed to have light-shielding properties from synthetic resin, metal, or the like, and in a box shape. Note that the housing 15 may be configured by a combination of a plurality of members. The housing 15 is provided with an opening portion 15*a* which opens toward the windshield. A light-transmitting plate 15*b* which closes the opening portion 15*a* is attached to the housing 15. The display light L, which is emitted from the display portion 11 and is reflected by the optical path changing mirror 12 and the reflecting mirror 13 in the named order, passes through the light-transmitting plate 15*b* and is radiated toward the windshield.

(Mirror Unit 20)

Figure 3:
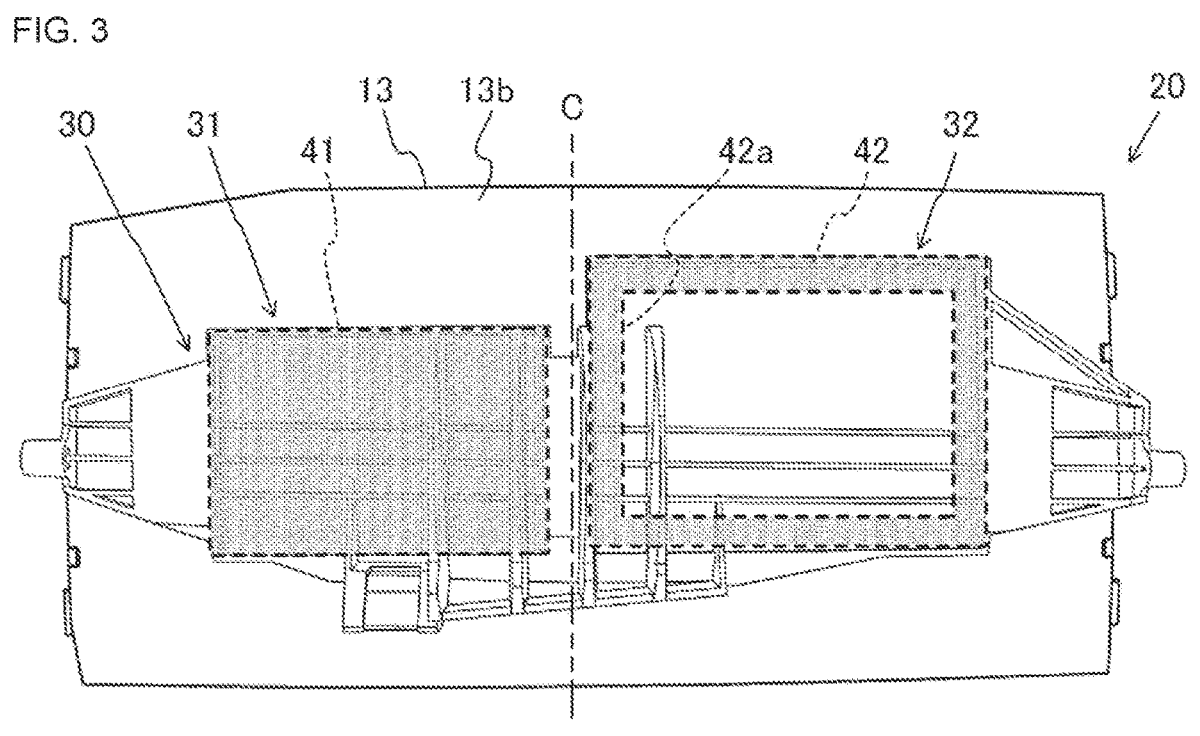

The mirror unit 20 is provided with the reflecting mirror 13, the holder 30, and a first double-sided tape 41 and a second double-sided tape 42 illustrated in FIG. 3. A back surface 13*b* is located at the back of the reflection surface 13*a* of the reflecting mirror 13.

Figure 2:
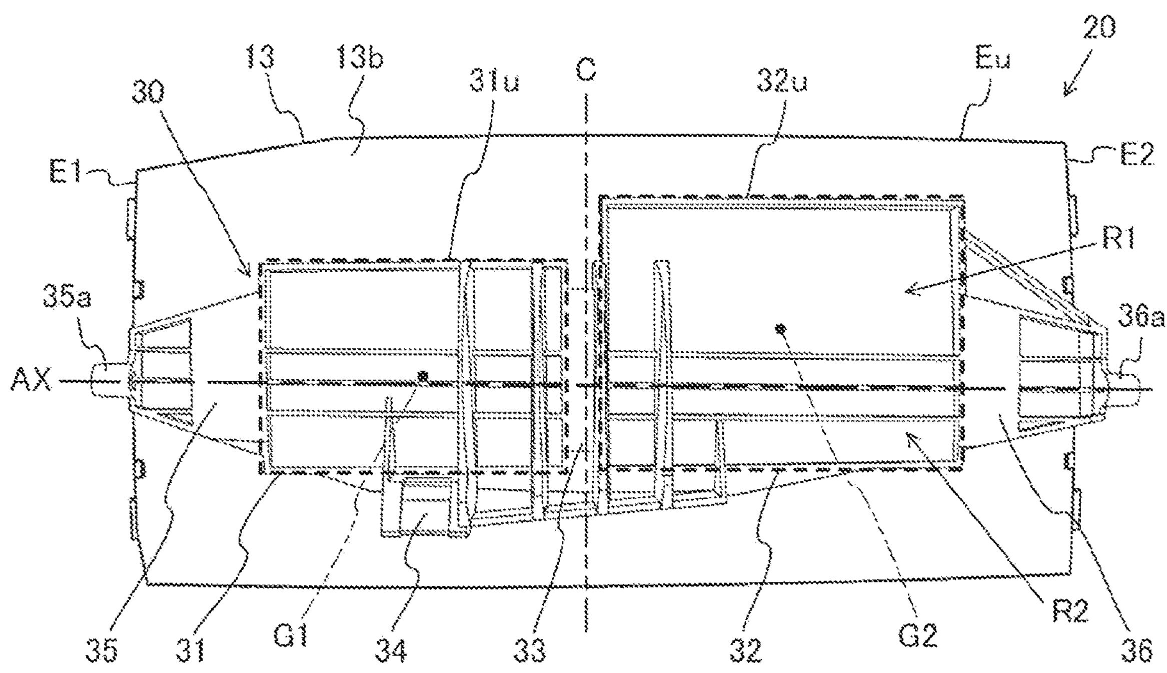
FIG. 2 is a rear view of a mirror unit according to the above-mentioned embodiment.

The holder 30 is made of a metallic material such as magnesium or of a synthetic resin material and holds the reflecting mirror 13 from the back surface 13*b*. As illustrated in FIG. 2, the holder 30 is provided with a first support part 31, a second support part 32, a connection portion 33, a part to be pressed 34, a first shaft forming portion 35, and a second shaft forming portion 36.

The part to be pressed 34 is a part which is pressed by the slider 14, and is, as illustrated in FIG. 1, a lever-shaped part which is formed to be hung down from the holder 30. The slider 14 is located below the part to be pressed 34, and has such a structure as to sandwich the part to be pressed 34 in between. By this structure, the slider 14 can press the part to be pressed 34 from the left when the slider 14 is moved to the right in FIG. 1, and can press the part to be pressed 34 from the right when the slider 14 is moved to the left in FIG. 1. Note that the shape and the structure of the slider 14 and the part to be pressed 34 are not limited and may be changed arbitrarily as long as the part to be pressed 34 can be pressed by the slider 14 which moves linearly.

Here, a left end of the reflecting mirror 13 in FIG. 2 is referred to as a first end E1, and a right end of the reflecting mirror 13 in FIG. 2 is referred to as a second end E2. The part to be pressed 34 is provided at a position which is deviated from a center C (a center line) of the reflecting mirror 13 toward the first end E1 in a direction in which the axis AX extends.

The first support part 31 is a part that is fixed to the back surface 13*b* of the reflecting mirror 13. The outer shape of the first support part 31 is rectangular as indicated by a broken line in FIG. 2. Also, the first support part 31 is at a position corresponding to the part to be pressed 34. Specifically, the first support part 31 is located above the part to be pressed 34. Here, when assuming that the first support part 31 "is at a position corresponding to the part to be pressed 34", it is sufficient if the first support part 31 is located above the part to be pressed 34, and also, the part to be pressed 34 is located within a range of a width of the first support part 31 in a direction along the axis AX. Further, the first support part 31 is located on the axis AX.

The second support part 32 is located closer to the second end E2 of the reflecting mirror 13 than the first support part 31, and is a part that is fixed to the back surface 13*b*. The outer shape of the second support part 32 is rectangular as indicated by a broken line in FIG. 2, and is larger than the outer shape of the first support part 31. Specifically, the second support part 32 is larger than the first support part 31 in terms of the area of the outer shape, and also, at least the height (the length in the up-down direction in FIG. 2) of the second support part 32 is greater than that of the first support part 31. Further, the second support part 32 is located on the axis AX.

Here, if the second support part 32 is formed in the same size as the first support part 31 and both of the first support part 31 and the second support part 32 are disposed on the axis AX, the natural frequency is decreased at the second end E2 (particularly, the upper part of the second end E2) of the reflecting mirror 13, which is located far from the part to be pressed 34, and it is feared that vibration resistance may not be maintained. However, since the second support part 32 which is larger than the first support part 31 in the outer shape as described above is provided on the holder 30, it is possible to support the back surface 13*b* of the reflecting mirror 13 up to a position that is more approximate to the second end E2. Consequently, according to the mirror unit 20 of the present embodiment, it is possible to prevent the natural frequency at a place in the vicinity of the second end E2 from decreasing, and vibration resistance can be maintained favorably.

The connection portion 33 is a part that connects the first support part 31 and the second support part 32, and is formed to be strip-shaped in which the height (the length in the up-down direction in FIG. 2) is smaller than that of the first support part 31. In the present embodiment, the center C (the center line) of the reflecting mirror 13 is positioned on the connection portion 33. In other words, in the present embodiment, the first support part 31 and the second support part 32 are located with the center C of the reflecting mirror 13 being interposed therebetween.

Here, in the present embodiment, the first support part 31 and the second support part 32 that the holder 30 has further satisfy the conditions described below.

An upper end 32*u* of the second support part 32 is closer to an upper end Eu of the reflecting mirror 13 than an upper end 31*u* of the first support part 31. With such a configuration, it is possible to prevent the natural frequency at the upper part of the second end E2, in particular, from decreasing, and the vibration resistance can be maintained favorably.

In addition, of two regions obtained by dividing the outer shape of the second support part 32 along the axis AX, when one region close to the upper end Eu of the reflecting mirror 31 is assumed as a first region R1, and the other region is assumed as a second region R2, the area of the first region R1 is greater than the area of the second region R2. With such a configuration, it is possible to prevent the natural frequency at the upper part of the second end E2, in particular, from decreasing, and the vibration resistance can be maintained favorably.

Also, the center of gravity G1 of the outer shape (i.e., a rectangle in the present embodiment) of the first support part 31 is at a position which is deviated from the center C of the reflecting mirror 13 toward the first end E1, and the center of gravity G2 of the outer shape (i.e., a rectangle in the present embodiment) of the second support part 32 is at a position which is deviated from the center C of the reflecting mirror 13 toward the second end E2. With such a configuration, it is possible to prevent the natural frequency at the second end E2 from decreasing, and the vibration resistance can be maintained favorably. Furthermore, in the present embodiment, since the center of gravity G2 of the outer shape of the second support part 32 is set closer to the upper end Eu of the reflecting mirror 13 than the axis AX, the above advantage is more remarkably exhibited.

The first shaft forming portion 35 is a part which is provided to extend from the first support part 31 to the first end E1. The first shaft forming portion 35 includes a shaft portion 35*a* at a distal end portion located beyond the first end E1. The shaft portion 35*a* is a cylindrical part extending along the axis AX.

The second shaft forming portion 36 is a part which is provided to extend from the second support part 32 to the second end E2. The second shaft forming portion 36 includes a shaft portion 36*a* at a distal end portion located beyond the second end E2. The shaft portion 36*a* is a cylindrical part extending along the axis AX.

The shaft portions 35*a* and 36*a* in a pair are rotatably supported by bearing portions (not illustrated) which are provided on the housing 15. Accordingly, the mirror unit 20 is provided to be rotatable about the axis AX with respect to the housing 15.

FIG. 3 illustrates arrangement of the first double-sided tape 41 and the second double-sided tape 42 by a broken line. The first double-sided tape 41 fixes the first support part 31 to the back surface 13*b* of the reflecting mirror 13. In other words, the first double-sided tape 41 is positioned to be sandwiched between the first support part 31 and the back surface 13*b*. The second double-sided tape 42 fixes the second support part 32 to the back surface 13*b* of the reflecting mirror 13. In other words, the second double-sided tape 42 is positioned to be sandwiched between the second support part 32 and the back surface 13*b*.

The second double-sided tape 42 is formed in a shape of a frame having an opening 42*a*. An outer peripheral shape of the second double-sided tape 42 is rectangular, and the opening 42*a* is also rectangular. The first double-sided tape 41 is rectangular, and the area thereof is substantially equal (including exactly equal) to the area of the opening 42*a*. By such a feature, when the second double-sided tape 42 is cut out from a sheet of a double-sided tape, the part corresponding to the opening 42*a* can be used as the first double-sided tape 41. Consequently, it is possible to eliminate the waste at the time of component preparation, and a cost advantage can be created. Preferably, the area of the first double-sided tape 41 should be less than or equal to the area of the opening 42*a*.

Preferably, the outer shape of the first double-sided tape 41 should be the same as the outer shape of the first support part 31, or slightly smaller than the outer shape of the first support part 31 such that the first double-sided tape 41 does not protrude from the first support part 31. Further, preferably, the outer peripheral shape of the second double-sided tape 42 should be the same as the outer shape of the second support part 32, or slightly smaller than the outer shape of the second support part 32 such that the second double-sided tape 42 does not protrude from the second support part 32.

In the present embodiment, after the holder 30 has been positioned with respect to the reflecting mirror 13 by using a jig (not illustrated), the holder 30 is fixed to the back surface 13*b* by using the first double-sided tape 41 and the second double-sided tape 42. Further, in the present embodiment, the holder 30 supports the reflecting mirror 13 by only the parts where the first double-sided tape 41 and the second double-sided tape 42 are placed. Here, of a surface of the second support part 32 facing the back surface 13*b*, the part corresponding to the opening 42*a* of the second double-sided tape 42 (hereinafter referred to as an opening corresponding portion) is to face the back surface 13*b* without intervention of a double-sided tape. The opening corresponding portion coming into contact with the back surface 13*b* causes an abrasion and abnormal noise. In order to suppress the above problem, it is preferable that at least one of the conditions that the thickness of the second double-sided tape 42 is ensured and that the opening corresponding portion is formed in a concave shape to be separated from the back surface 13*b* should be realized.

In the above, an example in which positioning of the holder 30 and the reflecting mirror 13 is performed by using a jig has been described. However, the positioning may be carried out by using a positioning pin, which is provided on one of the holder 30 and the reflecting mirror 13, and a positioning hole, which is provided in the other one of the holder 30 and the reflecting mirror 13 and is fitted with the pin. In other words, there may exist a configuration in which the holder 30 and the reflecting mirror 13 come into contact with each other at a region other than the regions of the first double-sided tape 41 and the second double-sided tape 42.

Note that the present disclosure is not limited to the above embodiment and drawings. Appropriate modifications (including deletion of constituent elements) may be made to the embodiment within a range in which the gist of the present disclosure is not changed.

As long as the conditions that the second support part 32 is located closer to the second end E2 of the reflecting mirror 13 than the first support part 31, and that the outer shape of the second support part 32 is larger than that of the first support part 31 are satisfied, the shape and arrangement of the first support part 31 and the second support part 32 may be arbitrarily changed. Similarly, the shape and arrangement of the first double-sided tape 41 and the second double-sided tape 42 may also be arbitrarily changed in accordance with the change to the first support part 31 and the second support part 32.

For example, the outer shapes of the first support part 31 and the second support part 32 are not limited to a rectangular shape, and may be a shape of a perfect circle, an ellipse, a triangle, a polygon, or the like.

For example, the first support part 31 and the second support part 32 may be directly connected to each other without intervention of the connection portion 33. Further, one of the first support part 31 and the second support part 32 may be located on the center C of the reflecting mirror 13. Even under such conditions, by adjusting the conditions of the upper end 32*u* of the second support part 32, the first region R1 of the second support part 32, the center of gravity G2 of the outer shape of the second support part 32, and the like, it is possible to prevent the natural frequency at a place in the vicinity of the second end E2 from decreasing, and the vibration resistance of the mirror unit 20 can be maintained favorably.

In the above, although an example in which the holder 30 includes two support parts has been described, the number of support parts that the holder 30 has may be three or more. In such a case, it is sufficient if support parts that satisfy the condition of the first support part 31 and the condition of the second support part 32 are included in the three or more support parts. The same holds true for the concept of the first double-sided tape 41 corresponding to the first support part 31 and the second double-sided tape 42 corresponding to the second support part 32.

Further, in a case where three or more support parts are provided on the holder 30, by forming these support parts to become larger stepwise from the first end E1 toward the second end E2, and also forming the shapes of the double-sided tapes attached to the respective support parts to have a nested configuration, it is possible to eliminate the waste at the time of component preparation, and a cost advantage can be created. In such a case, it is sufficient if double-sided tapes that satisfy the condition of the first double-sided tape 41 and the condition of the second double-sided tape 42 are included in the three or more double-sided tapes.

Further, the first support part 31 and the second support part 32 may be fixed to the back surface 13*b* of the reflecting mirror 13 by means other than a double-sided tape, such as an adhesive or a pressure-sensitive adhesive.

In an optical path of the display light L connecting the display portion 11 and the reflecting mirror 13, how many mirrors are to be used, how the optical path of the display light L is to be folded back, etc., may be changed as appropriate according to the design.

In the above, an example in which the reflecting mirror 13 of the mirror unit 20 is a concave mirror has been described. However, the reflecting mirror 13 may be other kinds of mirrors such as a curved mirror or a plane mirror.

The display portion 11 is not limited to one that uses an LCD and may be one that uses an organic light-emitting diode (OLED). In addition, the display portion 11 may be one that uses, for example, a reflective display device such as a digital micromirror device (DMD) or liquid crystal on silicon (LCOS).

An object onto which the display light L is to be projected is not limited to a windshield of a vehicle, and may be a combiner configured by a plate-shaped half mirror, a hologram element, and the like.

The type of a vehicle in which the HUD device 10 is to be mounted is not limited. The HUD device 10 can be mounted in various vehicles such as an automatic four-wheel vehicle or an automatic two-wheel vehicle. Further, the HUD device 10 may be mounted in transportation devices other than vehicles, such as aircrafts or ships.

In the description given above, in order to make the present disclosure easy to understand, descriptions of well-known technical matters are omitted as appropriate.

DESCRIPTION OF REFERENCE NUMERALS

10 Head-up display (HUD) device
L Display light
11 Display portion
13 Reflecting mirror
13*a* Reflection surface
13*b* Back surface
C Center
E1 First end
E2 Second end
Eu Upper end
14 Slider
20 Mirror unit
AX Axis
30 Holder
31 First support part
31*u* Upper end
G1 Center of gravity
32 Second support part
32*u* Upper end
G2 Center of gravity
R1 First region
R2 Second region
34 Part to be pressed
41 First double-sided tape
42 Second double-sided tape
42*a* Opening

The invention claimed is:

1. A mirror unit comprising:

a reflecting mirror; and a holder which holds the reflecting mirror from a back surface thereof, the mirror unit rotating about an axis as the holder is pressed by a slider which moves linearly, and being provided in a head-up display device, wherein the holder comprises:

a part to be pressed, which is at a position deviated from a center of the reflecting mirror toward a first end of the reflecting mirror in a direction in which the axis extends, and is pressed by the slider;

a first support part, which is at a position corresponding to the part to be pressed, and is fixed to the back surface; and a second support part, which is located closer to a second end opposite to the first end of the reflecting mirror than the first support part, is larger than the first support part in outer shape, and is fixed to the back surface, the first support part is fixed to the back surface by a first double-sided tape, the second support part is fixed to the back surface by a second double-sided tape, the second double-sided tape is formed in a shape of a frame having an opening, and an area of the first double-sided tape is less than or equal to an area of the opening.

2. The mirror unit according to claim 1, wherein an outer shape of each of the first support part and the second support part is rectangular.

3. The mirror unit according to claim 1, wherein an upper end of the second support part is closer to an upper end of the reflecting mirror than an upper end of the first support part.

4. The mirror unit according to claim 1, wherein, of two regions obtained by dividing an outer shape of the second support part along the axis, when one region close to an upper end of the reflecting mirror is assumed as a first region, and the other region is assumed as a second region, an area of the first region is greater than an area of the second region.

5. The mirror unit according to claim 1, wherein:

a center of gravity of an outer shape of the first support part is at a position which is deviated from the center of the reflecting mirror toward the first end in the direction in which the axis extends; and a center of gravity of an outer shape of the second support part is at a position which is deviated from the center of the reflecting mirror toward the second end in the direction in which the axis extends.

* * * * *